United States Patent
Bikass et al.

(10) Patent No.: US 10,173,146 B2
(45) Date of Patent: Jan. 8, 2019

(54) METHOD OF TREATING A MATERIAL

(71) Applicant: THERMTECH HOLDING AS, Bergen (NO)

(72) Inventors: Saeed Bikass, Bergen (NO); Stein-Kyrre Monsen, Myking (NO); Erik Michelsen, Fana (NO)

(73) Assignee: Thermtech Holdings AS, Bergen (NO)

(*) Notice: Subject to any disclaimer, the term of this patent is extended or adjusted under 35 U.S.C. 154(b) by 184 days.

(21) Appl. No.: 15/126,974

(22) PCT Filed: Apr. 13, 2015

(86) PCT No.: PCT/NO2015/000006
§ 371 (c)(1),
(2) Date: Sep. 16, 2016

(87) PCT Pub. No.: WO2015/156677
PCT Pub. Date: Oct. 15, 2015

(65) Prior Publication Data
US 2017/0095750 A1    Apr. 6, 2017

(30) Foreign Application Priority Data
Apr. 11, 2014 (GB) .................................. 1406538.7

(51) Int. Cl.
*B01D 3/38* (2006.01)
*B01D 3/34* (2006.01)
(Continued)

(52) U.S. Cl.
CPC .............. *B01D 3/38* (2013.01); *B01D 1/0058* (2013.01); *B01D 1/14* (2013.01); *B01D 3/148* (2013.01);
(Continued)

(58) Field of Classification Search
CPC .......... B01D 3/148; B01D 3/346; B01D 3/38; B01D 1/0058; B01D 1/14; B09B 3/0091
See application file for complete search history.

(56) References Cited

U.S. PATENT DOCUMENTS 4,419,215 A    12/1983  Voetter et al.
4,869,810 A     9/1989  Ellingsen et al.
(Continued)

FOREIGN PATENT DOCUMENTS

EP    0781313 B1    11/2002
GB    2097017 A     10/1982
(Continued)

OTHER PUBLICATIONS

Search Report (GB1506175.7), dated Jun. 16, 2015.
(Continued)

*Primary Examiner* — Jonathan Miller
(74) *Attorney, Agent, or Firm* — Gregory L. Porter; Hunton Andrews Kurth LLP (57) ABSTRACT

A method of treating a material to recover an oil from the material comprises heating the material to evaporate the oil, removing gas phase fluids from the material, and separating the oil from the gas phase fluids removed from the material, wherein the method includes mixing hot vapor with the material. The material being treated in the chamber is heated by friction within the chamber generated by a rotating shaft and flail. Injection of hot vapor improves the efficiency of the process to separate oil and any other evaporable liquids at lower temperatures. The thermal energy generated within the chamber is not consumed in changing the phase of large quantities of liquids in the material, and more of the energy generated is available to heat up the material and evaporate the oil fractions from the solids.

22 Claims, 4 Drawing Sheets (51) Int. Cl.
  *B09B 3/00* (2006.01)
  *F26B 11/12* (2006.01)
  *B09B 5/00* (2006.01)
  *F26B 25/00* (2006.01)
  *B01D 1/00* (2006.01)
  *B01D 1/14* (2006.01)
  *B01D 3/14* (2006.01)

(52) U.S. Cl.
  CPC ............ *B01D 3/346* (2013.01); *B09B 3/0091* (2013.01); *B09B 5/00* (2013.01); *F26B 11/12* (2013.01); *F26B 25/006* (2013.01)

(56) References Cited

U.S. PATENT DOCUMENTS

| | | | |
|---|---|---|---|
| 4,927,500 A * | 5/1990 | Martin | B01D 1/00 196/108 |
| 5,607,558 A | 3/1997 | Ellingsen | |
| 5,724,751 A | 3/1998 | Ellingsen | |
| 6,485,631 B1 | 11/2002 | Ellingsen | |
| 2003/0037922 A1 | 2/2003 | Gibson | |
| 2004/0144405 A1 | 7/2004 | Garrick et al. | |
| 2004/0149395 A1 | 8/2004 | Strand | |
| 2005/0145418 A1 | 7/2005 | Cordova | |

FOREIGN PATENT DOCUMENTS

| | | |
|---|---|---|
| GB | 2165259 A | 4/1986 |
| GB | 2338733 A | 12/1999 |
| WO | 1989/009638 A1 | 10/1989 |
| WO | 1995/017982 A1 | 7/1995 |
| WO | 1996/008544 A1 | 3/1996 |
| WO | 2005/046894 A1 | 5/2005 |
| WO | 2006/003400 A1 | 1/2006 |
| WO | 2007/022636 A1 | 3/2007 |

OTHER PUBLICATIONS

Search Report (GB1406538.7), dated Jun. 10, 2014.
International Search Report (PCT/NO2015/000006), dated Jul. 14, 2015.

* cited by examiner

METHOD OF TREATING A MATERIAL

BACKGROUND TO THE INVENTION

The present invention relates to a method of treating a material such as a compound to remove and typically recover an oil from the material. The method of the invention is particularly suitable for recovering hydrocarbons from a mixture of hydrocarbons and aqueous liquids. In certain aspects, the invention can also be useful to recover oil from a mixture of materials containing solids (for example sand, glass, and metal pieces), liquids (for example fluid phase hydrocarbons, with aqueous phases containing water) and gases. In certain examples, the method of the invention relates to the recovery of oily fractions from waste material. For example, the removal or recovery of production fluids emanating from the well, or drilling mud added to the well, from drill cuttings recovered from oil and gas wells, typically but not exclusively generated by drilling and intervention operations in the well.

The removal or recovery of oily fractions from materials such as waste products is useful in the processing of waste generated by oil and gas well drilling. When an oil or gas well is drilled into a formation containing valuable hydrocarbons to be recovered, the drilling process generates drill cuttings (small chips of rock etc.) which are washed back to the surface and recovered from the well by the circulation of drilling mud in the well. In addition to washing the drill cuttings back to the surface, drilling mud (also called drilling fluid) is used to cool the drill bit and to resist blow outs during the drilling operation. The drill cuttings recovered at the surface are usually contaminated by hydrocarbons from the reservoir, which permeate the rock that was drilled in order to form the bore hole, and also by the drilling mud that is pumped down the hole in order to wash the cuttings out of the well. The contamination of the cuttings by the drilling mud and the hydrocarbons that permeate the cuttings currently present challenges for the operator, because environmental concerns dictate that the hydrocarbons contaminating the cuttings must be removed or reduced below the threshold before the cuttings can be safely disposed of. In addition, efficiency savings can be made by recycling the used drilling mud for subsequent use in future cycles, and by recovering the hydrocarbons on the drill cuttings for export from the well with the other valuable production fluids. Therefore, it is useful to be able to separate and typically recover the oily materials contaminating the waste drill cuttings before disposal of the cuttings.

Various methods are known for the removal of oily contaminants from drill cuttings. The following previous publications are useful for understanding the invention: US 2004/0144405; U.S. Pat. Nos. 6,485,631; 5,724,751; 4,869,810; 5,607,558; 6,485,631; and EP 0781313. The disclosure of these earlier publications is incorporated herein by reference. Typically the prior methods of separating hydrocarbons from the waste material involves heating the waste in the chamber of a rotary mill to evaporate the various fractions from the cuttings as gasses, and to separate the hydrocarbons from the mixture of vapours by distillation. Typically it is desirable to evaporate the hydrocarbons at temperatures lower than their atmospheric boiling points to avoid changing the molecular characteristics or "cracking" the hydrocarbons, so that more of the valuable longer chain hydrocarbons recovered from the distillation process can be exported from the well along with the other valuable production fluids for downstream processing and refining.

SUMMARY OF THE INVENTION

According to the present invention there is provided a method of treating a material to recover an oil from the material, the method comprising heating the material to evaporate the oil, removing gas phase fluids from the material, and separating the oil from the gas phase fluids removed from the material, wherein the method includes mixing hot vapour with the material.

The oil is typically mixed with the material, and typically contaminates the material. The evaporation of the oil typically produces oil vapour and the oil vapour is typically removed from the material with the gas phase fluids. Typically the oil is separated from the gas phase fluids in a separate separation step such as distillation, typically occurring after the evaporation of the oil and the removal of gas phase fluids from the material.

Typically the material can comprise solids, liquids and/or gasses in any ratio. Optionally the material can comprise drill cuttings, oil-contaminated soils, bleaching earth, sludge from oil tanks, oil shale and fish wastes. Typically the material can comprise a compound.

Typically, the material being treated in the chamber is heated, typically before or during or after the injection of hot vapour. Typically the material being treated in the chamber is heated by friction within the chamber. Typically the hot vapour exchanges heat energy with (for example the hot vapour loses heat energy to) the material being treated in the chamber.

Typically the hot vapour can be formed by vaporising a liquid so that it changes phase into a gas phase. The vapour is typically obtained by raising the temperature of the liquid to its boiling point so that it boils and vaporises. Typically the hot vapour is produced from a substance which is typically in liquid form at atmospheric pressure e.g. approximately 101 kPa and at room temperature, e.g. 25° C. Typically the hot vapour is produced by heating the liquid above its boiling point at atmospheric pressure. Typically the liquid comprises water, and typically the hot vapour comprises steam, but other vapours formed by other liquids can be used in different examples of the invention.

Typically the oil can be separated from the gas phase fluids removed from the chamber by distillation. Typically a distillation device can be connected to an outlet of the chamber, through which the gas phase fluids can optionally be removed. Typically the chamber can have more than one outlet, and the same (or a separate) separation device such as a distillation device can optionally be connected to each outlet.

Injecting steam and/or other vapour from any other processes and/or from this process into the chamber can re-use the thermal energy inside the chamber. Re-using the available vapour from other processes and consuming less energy to heat up the material can increase the efficiency of the process. Then the process will not consume energy to make vapour (or steam).

Mixing hot vapour with the material being treated improves the efficiency of the process to separate oil and any other evaporable liquids at lower temperatures. Because of the hot vapour injection during the process, the thermal energy generated within the chamber is not consumed in changing the phase of large quantities of liquids in the material, and more of the energy generated is available to heat up the material and evaporate the oil fractions from the solids. Furthermore, mixing the hot vapour with the material reduces the partial pressure of the gas phase oily fractions being evaporated from the material in accordance with Dalton's law, which reduces the temperature at which these oily fractions evaporate from the material, and the temperature at which they distil in the condenser, thereby reducing the amount of energy needed to evaporate and condense the oily fractions.

The oil can comprise hydrocarbons, organic materials, mineral and non-mineral oils.

Optionally the material is mixed with additives such as catalysts, chemicals, solids and liquids to improve the separation and/or the recovery of the oil from the material before and/or during the process.

The material is typically treated in one or more chamber(s). Where more than one chamber is provided, the chambers may be connected, optionally in parallel or in series. The material being treated is typically fed into the chamber(s) and is heated to a desired temperature. The material may be preheated before being fed into the chamber(s). The material may already contain water or water may optionally be introduced prior to feeding the material into the chamber or may be injected into the chamber which can assist in reducing the process temperature if it exceeds optimal parameters. The hot vapour is typically injected into the chamber through one or more injection ports. The hot vapour typically initiates the process to evaporate the oil below its normal boiling point. The chamber typically has at least one inlet and at least one outlet to feed in and transport out all the phases (solids, liquids and gasses/vapour).

The preheating temperature, the heating rate, the vapour flow rate and the process temperature and pressure can be varied in different examples of the invention, dependant on the desired result.

The hot vapour can be generated by a boiler, or can be re-cycled from hot gas phase fluids recovered from the material, or from any other process and/or supplying sources.

The hot vapour may optionally be generated by energy generated within or recovered from the process and/or the ambient environment that may optimise energy efficiency.

The chamber(s) may have at least one rotor, which may optionally have a shaft with flails, discs, propellers, arms and/or blades connected to the shaft to rotate with it. The flails, discs etc. can be connected to the shaft by fixed, hinged, removable or adjustable connectors or can be in an integrated shape. The material being treated is typically heated by friction generated by the rotor. The material within the chamber can typically form a fluidized bed of material around the inner surface of the chamber, providing a large surface for the efficient transfer of the thermal energy. The passage of the flails etc. through the fluidised bed typically generates the friction, for example between the solid particles and the flails etc., or among the solid particles themselves) to heat the material in the chamber. Heating may also or alternatively be supplied from external sources in order to maintain the process temperature within a suitable range. For example the rotor/shaft or the chamber may be heated by other sources, for example by electric heaters, and/or the feed can be preheated. Suitable structural details for the chamber can be found in the earlier references cited above.

The friction may be enhanced by adding friction increasing solids such as sand, glass or metal pieces to the material being treated prior to feeding the material into the chamber(s), or optionally by injecting the same into the chamber(s) separately from the material to be treated. The solids may remain in the chamber(s) or may be removed from the chamber through an outlet. Typically the chamber can have more than one outlet. The retention time of the material within the chamber typically depends on process conditions, composition of the solids and desired result.

The chamber may be subjected to a vacuum when the material is being treated. The vacuum can optionally be generated by a vacuum pump optionally connected to an outlet on the chamber optionally via a separate vacuum system. The process may be used independently, in connection with, or as an integrated part of another process or apparatus either onshore or offshore.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one aspect can typically be combined alone or together with other features in different aspects of the invention. Any subject matter described in this specification can be combined with any other subject matter in the specification to form a novel combination.

Various aspects of the invention will now be described in detail with reference to the accompanying figures. Still other aspects, features, and advantages of the present invention are readily apparent from the entire description thereof, including the figures, which illustrates a number of exemplary aspects and implementations. Any subject matter described in the specification can be combined with any other subject matter in the specification to form a novel combination. The invention is also capable of other and different examples and aspects, and its several details can be modified in various respects, all without departing from the spirit and scope of the present invention. Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or is preceding the recitation of the composition, element or group of elements and vice versa. In this disclosure, the words "typically" or "optionally" are to be understood as being intended to indicate optional or non-essential features of the invention which are present in certain examples but which can be omitted in others.

All numerical values in this disclosure are understood as being modified by "about". All singular forms of elements, or any other components described herein are understood to include plural forms thereof and vice versa. References to directional and positional descriptions such as upper and lower and directions e.g. "up", "down" etc. are to be interpreted by a skilled reader in the context of the examples described and are not to be interpreted as limiting the invention to the literal interpretation of the term, but instead should be as understood by the skilled addressee.

BRIEF DESCRIPTION OF THE DRAWINGS

In the accompanying drawings:

FIG. 7 shows a schematic view showing the required power and process temperature to recover 150 kg of oil and treat 775 kg of solid per hour. In FIG. 7, the blocks represent the required power in kW shown in the left hand axis and the line graph and diamonds represent the corresponding process temperature, shown in the right hand axis.

DETAILED DESCRIPTION OF ONE OR MORE EXAMPLES OF THE INVENTION

Figure 1:
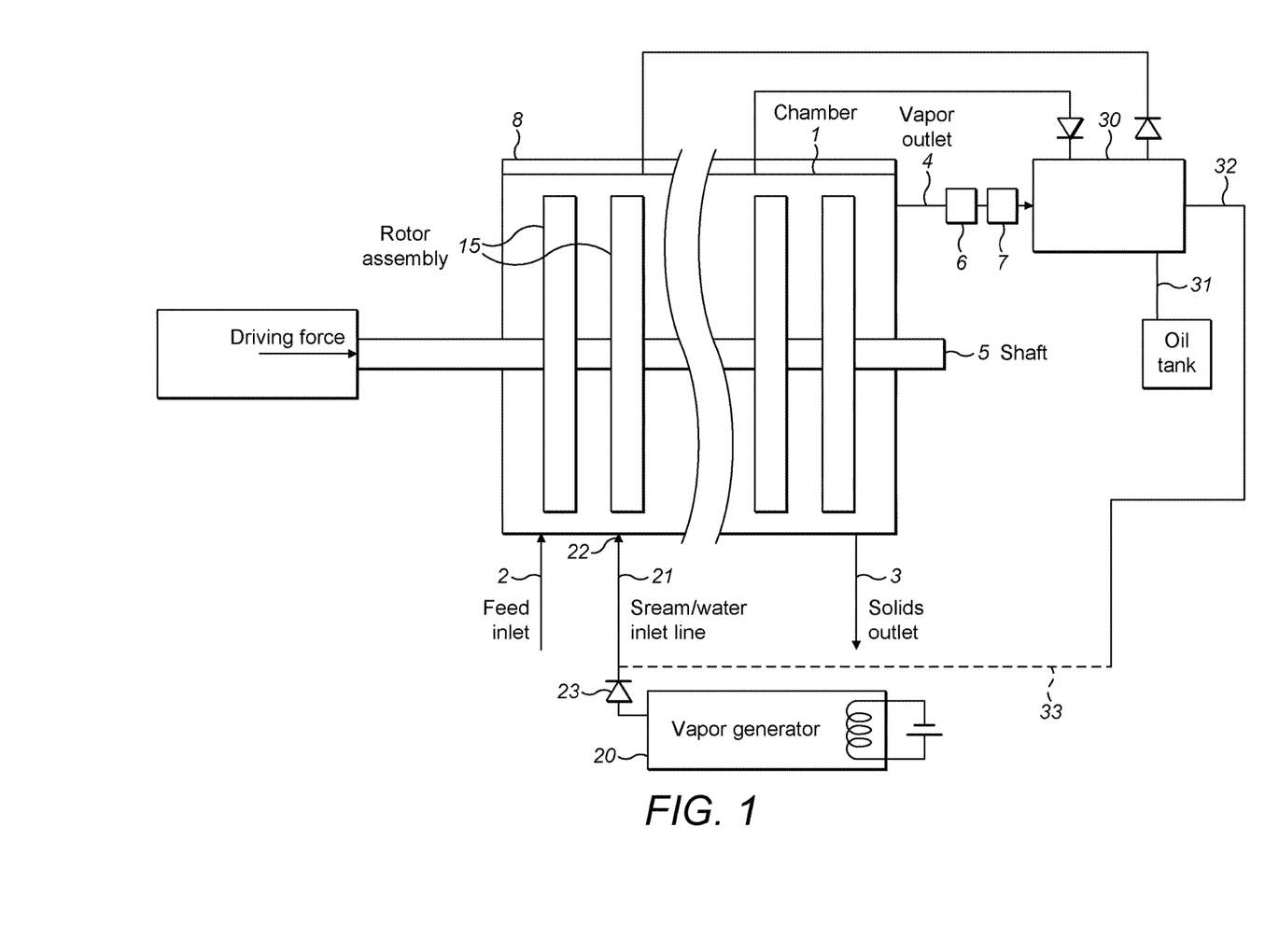
FIG. 1 shows a schematic side view of a chamber used in an example of the present invention.
Figure 2:
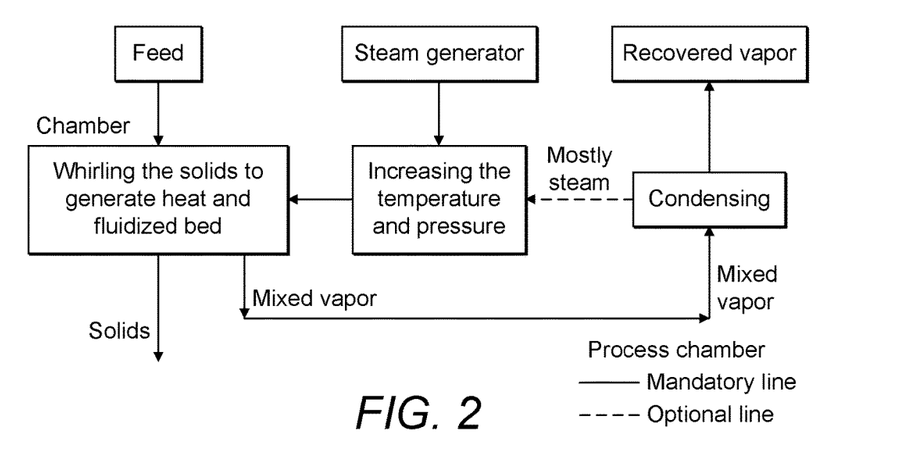
FIG. 2 shows a schematic diagram indicating the process in the chamber of FIG. 1.

Referring now to FIGS. 1 and 2, the apparatus used in the process of the present invention can optionally be essentially the same as those disclosed in the earlier references identified above, which are incorporated herein by reference, with some differences. For the purpose of the structural features of the chamber used in examples of the present invention, the reader is referred to these earlier references for additional teaching relating to these structural and operational features. Briefly, a suitable chamber for carrying out examples of the present invention is shown schematically in FIG. 1, and typically comprises a reactor vessel 1 having a body and end plates. Different configurations are possible. The schematic view shown in side view in FIG. 1 shows a hollow bore which receives a rotor assembly comprising an axle or driveshaft 5 bearing rotor arms or flails 15 which is driven in rotation by a motor 10. The rotor arms or flails 15 are typically of similar designs to those described in the earlier references cited above. The chamber 1 typically has at least one feed inlet at one end of the chamber bore, which may be at the top or the bottom of the chamber, close to one end wall, through which material to be treated is fed into the chamber 1, and at least one outlet 3 typically located at the opposite end of the chamber bore, typically at a lower end of the chamber 1, through which solids can leave the chamber following the conclusion of the cycle of treatment. The chamber 1 also has at least one vapour outlet or flue 4 typically located at an upper end of the chamber 1, through which gasses can leave the chamber following the conclusion of the cycle of treatment.

In addition to these features, the present example has a vapour generator in the form of a boiler 20, which generates hot vapour in the form of steam typically by heating liquid water to its boiling point within the boiler, and injecting the hot vapour in the form of steam through an injection line 21 and a vapour inlet 22 into the chamber 1, where it is mixed with the material being fed into the chamber 1 through the inlet 2. Typically the mixing of the hot vapour and the material being fed into the chamber 1 through the inlet 2 is accomplished or at least assisted by the rotational movement of the rotor assembly comprising the shaft 5 and rotor arms 15. Optionally, the injection line 21 can incorporate a check valve 23 preventing passage of the vapour from the injection line 21 into the boiler 20. The boiler 20 can optionally be electrically heated, either internally through a heater coil, or by any other suitable means, which can be varied in different examples of the invention.

The flue or vapour outlet 4 typically connects the bore of the chamber 1 with a condenser system comprising at least one (and optionally more than one) condenser 30 having a first outlet 31 leading to an oil collection tank and a 2nd outlet 32 leading to an optional reinjection line 33.

Typically the material to be treated comprises contaminated drill cuttings, which may incorporate oil-based drilling mud and/or indigenous hydrocarbons permeating the drill cuttings. The contaminated drill cuttings are fed into the inlet 2, typically on a conveyor, and drop into the bore of the chamber typically while the rotor assembly comprising the shaft 5 and rotors 15 are being driven in rotation by the motor 10. Optionally the rotor assembly can be rotated within the chamber 1 (optionally with a solid particulate material such as sand etc. in the chamber) before the material is fed into the chamber in order to preheat the chamber to a suitable operating temperature or alternatively the chamber can be preheated by any other method such as electrical heat tracing. The configuration of the rotor assembly can typically be as disclosed in the earlier references cited above, and the reader is referred to those publications for further details of the basic structural aspects of the chamber 1. Driving the rotor assembly at sufficient speeds raises the temperature of the material within the internal bore of the chamber 1 to around 260 to 270° C., or to a temperature to suit the material being processed, typically at a temperature slightly below the boiling point of the oil to be removed from the material.

Water vapour at high temperature in the form of steam from the boiler 20 is injected through the check valve 23 and injection line 21 into the inlet 22 of the chamber 1, and is mixed with the material being treated by the rotating rotors 15.

Typically the temperature of the steam injected is greater than 100° C., i.e. typically the steam is superheated. Optionally the steam can be injected into the chamber at 120-150° C. in some cases where relatively little additional heat energy from the hot vapour is desired, but this parameter can optionally be varied according to the anticipated evaporation temperature of the oil, and in some cases, higher temperatures can optionally be used for the injected steam, for example, greater than 200° C., e.g. 300° C. or more.

Typically the rotors are operated at the speeds described in the earlier references, to which the reader is referred for further details. The heat from the friction generated by rotation of the rotor assembly in combination with the heat energy from the hot vapour added from the boiler 20 increases the temperature within the chamber 1 until the oil evaporates in gas phase from the solid drill cuttings. Typically this happens below the atmospheric boiling point of the oil, because of the so-called steam stripping process by introducing the hot vapour from the boiler 20. The gas phase components including the gas phase oil fraction are liberated from the drill cuttings and pass or are drawn through the outlet by an optional vacuum pump 6, which may be mounted in the line connecting the outlet 4 with the condenser 30. Optionally, the line connecting the outlet 4 with the condenser 30 may also include a cyclone 7 to remove particulate material from the gasses before they reach the condenser 30. Because of the presence of the hot vapour in the chamber mixture, the partial pressures of the gasses are reduced thereby reducing the evaporation temperatures of the oily fractions.

Within the condenser 30, heat is optionally exchanged between a coolant that circulates between the condenser 30 and the chamber 1, which absorbs heat from the gas phase material within the condenser 30 and carries it to the chamber 1 where it is lost to the chamber 1, thereby increasing the thermal efficiency of the system. After losing its heat to the chamber 1, the coolant is recycled back to the condenser 30 at a lower temperature, where it again absorbs heat from the gas phase material passing through the condenser 30. Optionally a heat exchanger can be provided in the lines between the condenser and the chamber. The coolant circuit between the condenser 30 and the chamber 1 is optional, and may be omitted from certain examples of the invention. Also, the coolant circuit can be connected between the condenser 30 and some other component of the same or ancillary equipment, in order to act as a heat pump absorbing heat from the gasses passing through the condenser 30 and transferring that energy to another part of the same process or to a different process, in order to improve the overall efficiency of the same.

When the gas phase materials passing through the condenser 30 lose their heat to the coolant, the oil fraction of the gas phase materials within the condenser 30 condense back into liquid form within the condenser, and are drained through the outlet 31 into the oil tank. Further purification steps can be carried out on the condensate material draining into the oil tank 31 dependent on the desired fraction to be recovered, but at this point, that oil is effectively and efficiently separated and recovered from the original waste materials. The oil can be exported from the tank 31 and can be further processed if needed, or used as required, and because it has merely changed phase at a relatively low temperature, the molecular structure of the oil is almost unaffected, and the valuable longer chain hydrocarbons can be retained for processing of more complex chemicals.

Not all of the gas phase materials passing through the condenser will condense at the same temperature, and many gas phase materials will pass through the condenser without condensing into liquid form. These typically pass through the outlet 32 and optionally can be recycled into the reinjection line 33 which typically connects to the injection line 21 downstream of the check valve 23, thereby allowing recycling of the high-temperature gas phase materials from the outlet 32 back into the chamber through the reinjection line 33 and injection line 21. Optionally where the high temperature gas phase fluids are recycled into the chamber the fluids can optionally be heated and/or pressurised before being re-introduced into the chamber. The recycling of the high-temperature gas phase materials out of the condenser and back into the chamber is one option that can be omitted from certain examples of the invention, but which is advantageous, because the thermal energy escaping from the condenser 30 is recycled back into the chamber 1, thereby improving the thermal efficiency of the process, and any fractions of oils that pass through the condenser without changing phase back into liquid form are recycled for further treatment.

Optionally, the shaft 5 can be hollow, and can optionally receive heated fluids, either from the condenser 30, or from another source such as a heat pump, or a different piece of apparatus which may or may not be part of the system for treating materials. Optionally, the chamber 1 can incorporate an oil jacket 8, which can be heated using fluids from the condenser 30, or from another heat source.

Figure 3:
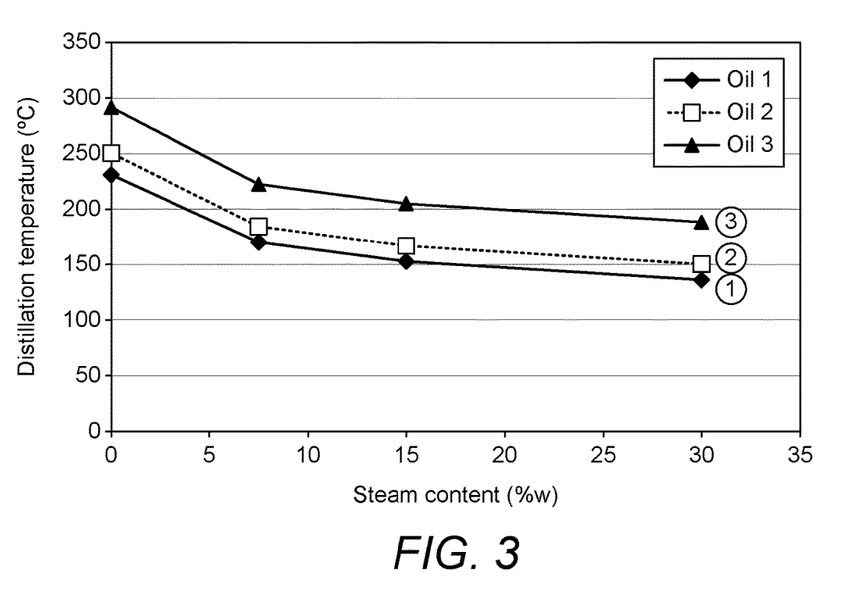
FIG. 3 shows a graph illustrating the effect of steam content within the chamber on the evaporation temperature of oils being treated in the chamber of FIG. 1.
Figure 4:
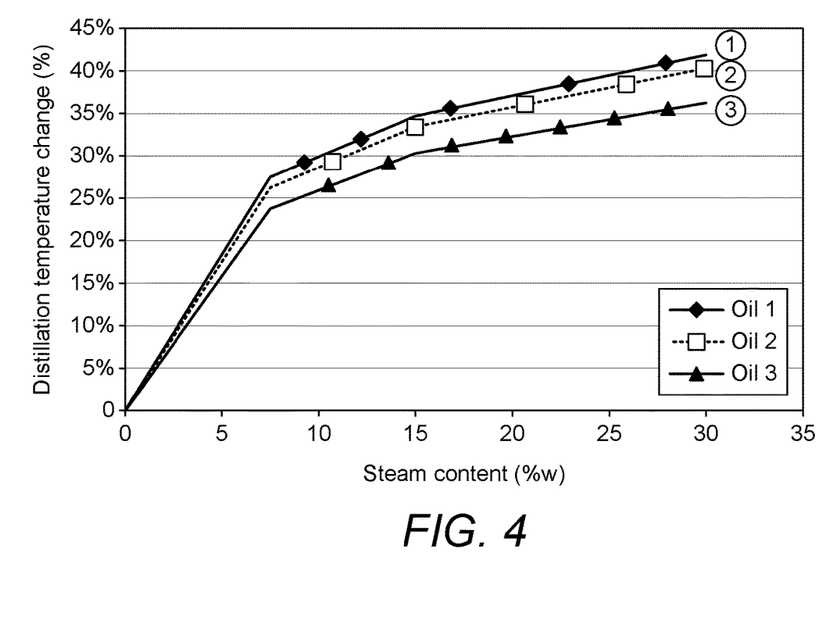
FIG. 4 shows a graph illustrating the percentage change in the evaporation temperature of the oils in FIG. 3 as a result of different contents of steam within the chamber in FIG. 1.

Referring now to FIGS. 3 and 4, drill cuttings contaminated by 3 different oils were subjected to the above process with different w % contents of steam injected as hot vapour into the chamber 1 in each case. Each sample of contaminated cuttings was tested in different treatment cycles using different amounts of steam in each cycle.

In each example, three different cycles were performed using 7.5%, 15% and 30% per weight of steam injected into the chamber 1. In each example, with 0% steam injection, the 3 oils from the different samples all evaporated from the cuttings at significantly higher temperatures than when steam was injected. In each case, 4000 kg cuttings were used with an estimated contaminating oil content of 17.6% w. Generally the mix by w % of solids:oil:steam was approximately 70:15:15 (with the 15% w steam example).

EXAMPLE 1

Drill cuttings were contaminated with oil 1 with a boiling point in the absence of steam injection of 230° C. Upon injection of 7.5% w of steam into the chamber, the oil was evaporated from the cuttings when the chamber had reached 160° C. Upon injection of 15% w of steam into the chamber, the oil had evaporated from the cuttings when the chamber had reached 150° C., and upon injection of 30% w steam into the chamber, the oil had evaporated when the chamber temperature had reached 130° C. Accordingly, injection of the steam into the chamber as part of the process dramatically reduced the temperature at which the oil evaporated from the cuttings, and thereby reduced the heat energy required to operate the process and separate the oil from the cuttings.

EXAMPLE 2

Drill cuttings were contaminated with oil 2 with a distillation temperature in the absence of steam injection of 250° C. Upon injection of 7.5% w of steam into the chamber, the oil was evaporated from the cuttings when the chamber had reached 180° C. Upon injection of 15% w of steam into the chamber, the oil had evaporated from the cuttings when the chamber had reached 166° C., and upon injection of 30% w steam into the chamber, the oil had evaporated when the chamber temperature had reached 150° C. Accordingly, injection of the steam into the chamber as part of the process dramatically reduced the temperature at which the oil evaporated from the cuttings, and thereby reduced the heat energy required to operate the process and separate the oil from the cuttings.

EXAMPLE 3

Drill cuttings were contaminated with oil 3 with a distillation temperature in the absence of steam injection of 295°

C. Upon injection of 7.5% w of steam into the chamber, the oil was evaporated from the cuttings when the chamber had reached 220° C. Upon injection of 15% w of steam into the chamber, the oil had evaporated from the cuttings when the chamber had reached 200° C., and upon injection of 30% w steam into the chamber, the oil had evaporated when the chamber temperature had reached 190° C. Accordingly, injection of the steam into the chamber as part of the process dramatically reduced the temperature at which the oil evaporated from the cuttings, and thereby reduced the heat energy required to operate the process and separate the oil from the cuttings.

FIG. 4 shows the percentage change in the temperature at which the oils in the previous examples evaporates in the chamber in accordance with the different steam injections. As can be seen from the graph in FIG. 4, the largest percentage change in the evaporation temperature of the oil from the cuttings is seen with oil 1, followed by oil 2, and subsequently by oil 3. Generally, a dramatic reduction in the boiling point of the oil is shown with the injection of even small amounts of steam, with increased amounts of steam injection showing a non-linear response, but still showing an improvement as more steam by % w is injected into the chamber during the process.

By increasing the steam content inside the chamber, the oil separates from the drill cuttings at lower temperatures requiring less heat energy and therefore allowing a more efficient system. For example 15% w of steam (and 15% w oil) can decrease the process temperature required to drive off the oil from the cuttings by up to 30-35%. If the steam content increases up to 30% w the process can be completed at 36-42% lower temperature. Lowering the temperature of the process below the atmospheric boiling temperature of the oil enables recovery of heavier oils with lower risks of cracking and changing the molecular structure of the oil, which is therefore unaffected in value and can be exported from the process and sold, thereby further increasing the efficiency of the overall process.

When the steam is injected into the chamber, the steam absorbs the thermal energy and it prevents the temperature from rising. The lower temperature of the operation is technically advantageous as the lower temperatures reduce the demands of the process on the mechanical structure of the chamber as well as improving the quality of the recovered oil. Hence, the injection of steam facilitates a more stable process inside the chamber. Accordingly more of the chamber components and mechanical structure can be of standard quality and design, saving costs in the construction and maintenance of the chamber.

Injecting steam that has been recycled from the condenser offers additional energy savings and efficiencies and can save significant amounts of energy.

EXAMPLE 4

Figure 5:
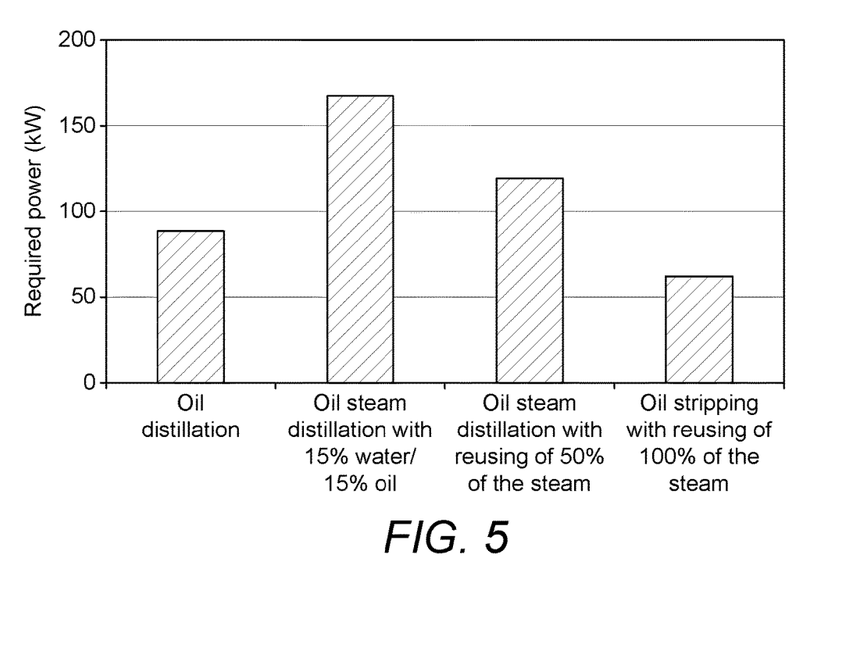
FIG. 5 shows a schematic graph of the thermal energy required to treat a tonne of feed material per hour in different conditions with no water; with 15% water and 15% oil and without injection of hot vapour; with injection of hot vapour and recycling of 50% of the steam generated in the process; and with 100% recycling and re-injection of the steam generated in the process.
Figure 6:
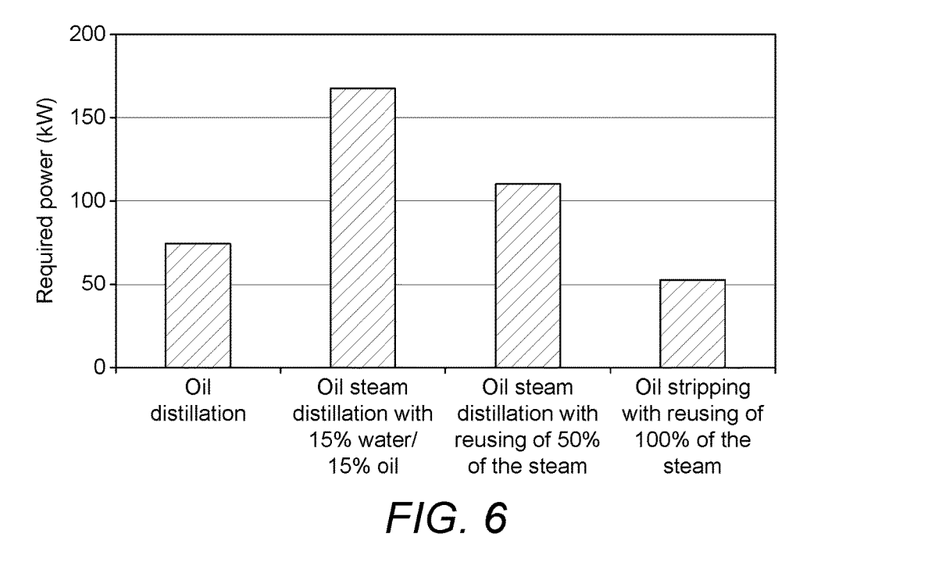
FIG. 6 shows a schematic view similar to FIG. 5 showing the required power to recover 150 kg of oil and treat 700 kg of feed per hour.

An example of energy saving is shown in FIGS. 5 and 6. In this example oil type 2 is mixed with solid feed material and treated as described above in the chamber in a range of different ratios of oil:water:solid. As can be seen from the second column, with no steam injection, the amount of energy required to complete the process exceeds 150 kW/hr. By injecting steam as shown in the third and fourth columns, lower energy rates are required to complete the process, and re-cycling of the steam from the output to the input as described above decreased the required energy substantially.

In example 4, the composition of the components of the second to fourth columns was 15:15:70 (oil:water:solid).

EXAMPLE 5

Figure 7:
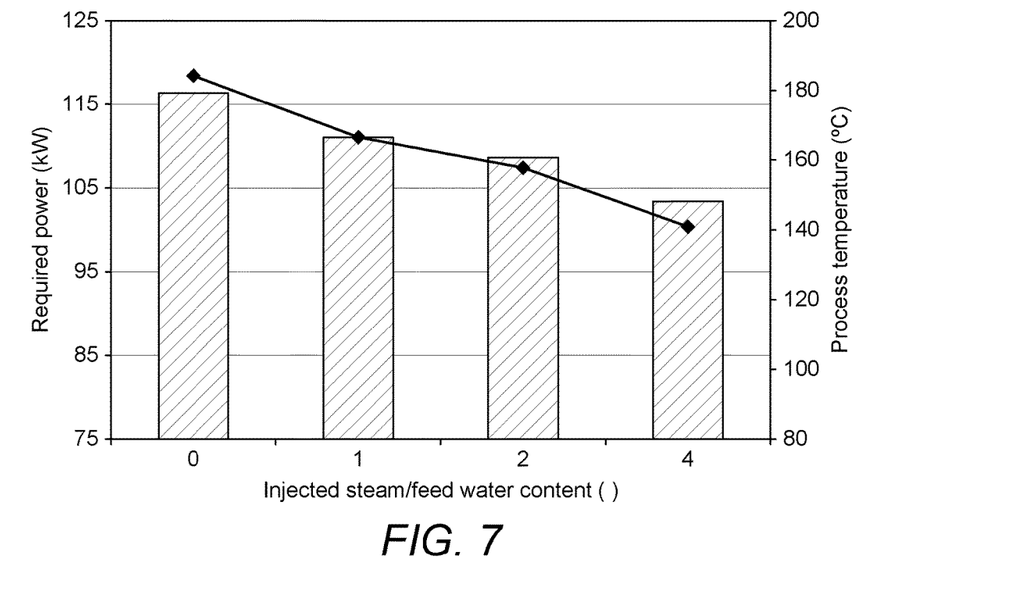

In example 5, steam was injected into the process chamber in different ratios with respect to the feed water content fed into the chamber. The different ratios are shown in the separate columns 0, 1, 2 and 4 in FIG. 7. For example, in column 0, there was no injected steam; in column 1, the ratio of injected steam to liquid water in the feed was 1:1; in column 2, the ratio was 2:1; and in column 4 the ratio was 4:1. In these examples, the process temperature reached during the process is shown in the right hand axis represented by the diamond markers joined by the line, and the power required for each process run is shown in the left hand axis, represented by the columns 0, 1, 2 and 4. In all of these examples, steam injection in accordance with the method can be seen to dramatically reduce the temperature of the process. In each case, 150 kg oil was recovered from 775 kg of solid feed material. However, as the ratio of injected steam to original water content increased from 0 to 4:1, the process temperature reached during the process decreased by about 40° C. in the example of the 4:1 ratio. The reduction in temperature required for the satisfactory completion of the separation process as more steam was injected is beneficial from a technical perspective, as the lower operating temperatures are less demanding on the structural integrity of the chamber, and take less time to reach the operating temperature at which separation can be achieved. In addition, the reduction in temperature has significant environmental and cost benefits, as energy is saved during the process, and less fuel is consumed, while still achieving the same separation of the oil from the solids.

Modifications and improvements can be incorporated without departing from the scope of the invention.

What is claimed is:

1. A method of treating a material to separate an oil from the material, the method comprising heating the material within a chamber to evaporate the oil, wherein the chamber has a rotor, the rotor having a shaft with at least one arm connected to the shaft, whereby the at least one arm is adapted to rotate with the shaft, and wherein the material is heated during the method by friction generated by the rotation of the rotor, shaft and the at least one arm within the chamber, wherein the method includes removing gas phase fluids from the material, and separating the oil from the gas phase fluids removed from the material, wherein the method includes injecting hot vapor into the chamber and mixing the injected hot vapor with the material in the chamber, wherein the method includes driving the rotor at a speed sufficient to raise the temperature of the material within the chamber to a process temperature of at least 260-270° C., wherein the process temperature of at least 260-270° C. is below an atmospheric boiling point of the oil, and wherein the method includes evaporating the oil from the material as a gas phase fluid at the process temperature below the atmospheric boiling point of the oil.

2. A method as claimed in claim 1, wherein the oil is separated from the gas phase fluids in a separate distillation step.

3. A method as claimed in claim 2, wherein the separate distillation step occurs after the evaporation of the oil and the removal of gas phase fluids from the material.

4. A method as claimed in claim 1, wherein the hot vapor exchanges heat energy with the material being treated in the chamber.

5. A method as claimed in claim 1, wherein the hot vapor loses heat energy to the material being treated in the chamber.

6. A method as claimed in claim 1, wherein the hot vapor comprises steam.

7. A method as claimed in claim 1, wherein the oil is separated from the gas phase fluids removed from the chamber by distillation.

8. A method as claimed in claim 1, wherein a distillation device is connected to an outlet of the chamber, through which the gas phase fluids are removed.

9. A method as claimed in claim 1, wherein hot vapor passing from an outlet of the chamber is re-injected into the chamber.

10. A method as claimed in claim 1, wherein hot vapor produced as a by-product from another process is injected into the chamber.

11. A method as claimed in claim 1, wherein the material is mixed with additives to improve the separation and/or the recovery of the oil from the material, and wherein the additives are mixed with the material before and/or during the process.

12. A method as claimed in claim 1, wherein the material is sequentially treated in more than one chamber.

13. A method as claimed in claim 1, wherein the material is preheated before being fed into the chamber.

14. A method as claimed in claim 1, wherein the hot vapor is generated by energy generated within or recovered from the method.

15. A method as claimed in claim 1, wherein the material being treated forms a fluidized bed of material around the inner surface of the chamber, and wherein the passage of the at least one arm through the fluidized bed generates the friction to heat the material in the chamber.

16. A method as claimed in claim 1, including adding friction increasing solids to the material in the chamber.

17. A method as claimed in claim 1, wherein the chamber is subjected to a vacuum when the material is being treated.

18. A method as claimed in claim 1, wherein a vacuum pump is connected to an outlet on the chamber and wherein the method includes applying a vacuum to the chamber.

19. A method as claimed in claim 1, wherein the arm is connected to the shaft by a hinged connection.

20. A method as claimed in claim 1, wherein the at least one arm comprises at least one of a flail, disc, propeller and a blade.

21. A method of treating a material to separate an oil from the material, the method comprising heating the material within a chamber to evaporate the oil, wherein the chamber has a rotor, the rotor having a shaft with at least one arm connected to the shaft, whereby the at least one arm is adapted to rotate with the shaft, and wherein the material is heated during the method by friction generated by the rotation of the rotor, shaft and the at least one arm within the chamber, wherein the method includes removing gas phase fluids from the material, and separating the oil from the gas phase fluids removed from the material, wherein the method includes injecting hot vapor into the chamber and mixing the injected hot vapor with the material in the chamber, wherein the method includes driving the rotor at a speed sufficient to raise the temperature of the material within the chamber to a process temperature of at least 260-270° C., wherein the process temperature of at least 260-270° C. is below an atmospheric boiling point of the oil, and wherein the method includes evaporating the oil from the material as a gas phase fluid at the process temperature below the atmospheric boiling point of the oil, and passing the gas phase fluid through a distillation device to remove the oil from the gas phase fluid by distillation.

22. A method of treating a material to separate an oil from the material, the method comprising heating the material within a chamber to evaporate the oil, wherein the chamber has a rotor, the rotor having a shaft with at least one arm connected to the shaft, whereby the at least one arm is adapted to rotate with the shaft, and wherein the material is heated during the method by friction generated by the rotation of the rotor, shaft and the at least one arm within the chamber, wherein the method includes removing gas phase fluids from the material, and separating the oil from the gas phase fluids removed from the material, wherein the method includes injecting hot vapor into the chamber and mixing the injected hot vapor with the material in the chamber, wherein the method includes driving the rotor at a speed sufficient to raise the temperature of the material within the chamber to a process temperature of at least 260-270° C., wherein the process temperature of at least 260-270° C. is below an atmospheric boiling point of the oil, and wherein the method includes evaporating the oil from the material as a gas phase fluid at the process temperature below the atmospheric boiling point of the oil, and passing the gas phase fluid through a distillation device to remove the oil from the gas phase fluid by distillation, wherein the material being treated forms a fluidized bed of material around the inner surface of the chamber, and wherein the chamber is heated to the process temperature by friction caused by the passage of the at least one arm through the fluidized bed.

* * * * *

UNITED STATES PATENT AND TRADEMARK OFFICE
CERTIFICATE OF CORRECTION

| | |
|---|---|
| PATENT NO. | : 10,173,146 B2 |
| APPLICATION NO. | : 15/126974 |
| DATED | : January 8, 2019 |
| INVENTOR(S) | : Saeed Bikass, Stein-Kyrre Monsen and Erik Michelsen |

Page 1 of 1

It is certified that error appears in the above-identified patent and that said Letters Patent is hereby corrected as shown below:

On the Title Page

Please change -- (73) Assignee: Thermotech Holdings AS -- to -- (73) Assignee: Thermtech Holding AS --

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*